United States Patent
Brinker et al.

(10) Patent No.: US 8,490,184 B2
(45) Date of Patent: Jul. 16, 2013

(54) VERIFICATION FOR COMPUTER PROGRAMS THAT INCLUDE EXTERNAL CALL REFERENCES

(75) Inventors: Michael Brinker, Rochester, MN (US); Rick Dale Hemmer, Rochester, MN (US); Daniel Mark Hursh, Saint Charles, MN (US); Jeffrey Mark Uehling, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1396 days.

(21) Appl. No.: 11/740,422

(22) Filed: Apr. 26, 2007

(65) Prior Publication Data

US 2008/0271140 A1 Oct. 30, 2008

(51) Int. Cl.
*G06F 21/00* (2006.01)

(52) U.S. Cl.
USPC ............. 726/22; 717/126; 717/127; 717/167; 717/173; 726/24; 726/26; 726/27

(58) Field of Classification Search
USPC ................ 717/127, 167, 173; 726/22, 24, 26, 726/27
See application file for complete search history.

(56) References Cited

U.S. PATENT DOCUMENTS

| | | |
|---|---|---|
| 5,699,310 A | 12/1997 | Garloff et al. |
| 5,797,014 A | 8/1998 | Gheith |
| 5,822,787 A | 10/1998 | Zucker |
| 5,892,904 A | 4/1999 | Atkinson et al. |
| 5,970,252 A | 10/1999 | Buxton et al. |
| 5,978,484 A | 11/1999 | Apperson et al. |
| 5,987,123 A | 11/1999 | Scott et al. |
| 6,182,223 B1 * | 1/2001 | Rawson .......................... 726/22 |
| 6,195,794 B1 * | 2/2001 | Buxton ......................... 717/108 |
| 6,212,578 B1 | 4/2001 | Racicot et al. |
| 6,363,436 B1 | 3/2002 | Hagy et al. |
| 6,367,012 B1 | 4/2002 | Atkinson et al. |
| 6,546,433 B1 | 4/2003 | Matheson |
| 6,564,223 B1 | 5/2003 | Sexton et al. |
| 7,062,650 B2 | 6/2006 | Robbins et al. |
| 2004/0139342 A1 * | 7/2004 | Aho et al. ..................... 713/200 |
| 2005/0010804 A1 * | 1/2005 | Bruening et al. ............. 713/200 |
| 2005/0198507 A1 * | 9/2005 | Brender et al. ............... 713/170 |
| 2006/0206899 A1 * | 9/2006 | Suzuki et al. ................. 718/104 |
| 2007/0198841 A1 * | 8/2007 | Lundblade et al. ........... 713/176 |

OTHER PUBLICATIONS

Parlante ,Linked List Basics, http://cslibrary.stanford.edu/103/LinkedListBasics.pdf, 2001.*
U.S. Appl. No. 10/341,981 "Method and Apparatus for Protecting External Call References", filed Jan. 14, 2003.

* cited by examiner

*Primary Examiner* — Jeffrey Pwu
*Assistant Examiner* — Thomas C Lauzon
(74) *Attorney, Agent, or Firm* — Martin & Associates LLC (57) ABSTRACT

A program verification mechanism includes an external call reference verification mechanism that verifies external call references in a computer program. The external call reference verification mechanism checks the computer program after the computer program has been loaded by a loader/linker. The loader/linker stores a list of trusted entry points that specifies a trusted entry point for each external call reference, along with a list of allowable caller code for each trusted entry point. The external call reference verification mechanism determines the entry point for each instruction that is an external call reference, determines whether the entry point is listed as the trusted entry point for the external call reference, and whether the external call reference instruction is in the list of allowable caller code for the trusted entry point. If so, the computer program is verified. If not, verification of the computer program fails.

17 Claims, 5 Drawing Sheets

| Module M | | |
|---|---|---|
| Address | Offset | Instruction |
| FFFFFFFFD0001200 | 0000002C | FBC10058 std  30,0x58(1) |
| FFFFFFFFD0001204 | 00000030 | F8A10058 std   5,0x58(1) |
| FFFFFFFFD0001208 | 00000034 | 60040000 ori   4,0,0 |
| FFFFFFFFD000120C | 00000038 | 60000000 ori   0,0,0 |
| FFFFFFFFD0001210 | 0000003C | 4BFFD115 bl    00000000    call.extern GPR3=".memcpy" |
| FFFFFFFFD0001214 | 00000040 | 60000000 ori   0,0,0 |
| FFFFFFFFD0001218 | 00000044 | 2C230000 cmpi  0,1,3,0 |
| FFFFFFFFD000121C | 00000048 | FBC10058 std  30,0x58(1) |
| FFFFFFFFD0001220 | 0000004C | 382100A0 addi  1,1,160 |
| FFFFFFFFD0001224 | 00000050 | E8010028 ld    0,0x28(1) |
| FFFFFFFFD0001228 | 00000054 | 7C0803A6 ori   8,0,0 |
| FFFFFFFFD000122C | 00000058 | EB81FFE3 lmd  28,-0x20(1) |
| FFFFFFFFD0001230 | 0000005C | 4E800020 bclr 20,0,0 |

VERIFICATION FOR COMPUTER PROGRAMS THAT INCLUDE EXTERNAL CALL REFERENCES

BACKGROUND

1. Technical Field

This disclosure generally relates to computer systems, and more specifically relates to verification of computer programs in computer systems.

2. Background Art

Computer programs have been distributed for some time on recordable media, such as floppy disk or CD-ROM. In recent times, the internet has become a valuable tool in distributing computer programs. One significant advantage of downloading computer programs via the internet is the programs are available immediately. No more must a person go to a store, browse through the boxes of computer programs on a shelf, select the one of interest, purchase the computer program, then return home to install the computer program. Instead the person may browse to a web site that offers the computer program, pay via credit card, and download the computer program immediately after the purchase.

Many computer programs now offer online updates via the internet. A person's computer may periodically check a website for updates to a specific computer program, and when an update is found, the update may be automatically downloaded. Because so many people and companies rely upon computers for both business and pleasure, it is essential to verify a computer program is valid before it is installed. Digital signatures have been used to verify the validity of computer programs. A digital signature is a unique identifier that is generated using public key/private key encryption techniques over specified data. For a computer program, a digital signature may be created for invariant data, which is data in the computer program that does not change. Many computer programs include calls external to the computer program, such as to program libraries or operating system calls. Because the target of external calls are not known by the computer program at compile time, external calls are considered variant data, and typically are excluded from the data covered by the digital signature. As a result, external calls provide a point of vulnerability for a computer program. A hacker could potentially hack an external call reference to call the hacker's code, and the calling program might never know it has called unauthorized code. Without a way to validate computer programs that contain external call references, such programs will remain vulnerable to attacks by hackers.

BRIEF SUMMARY

A program verification mechanism includes an external call reference verification mechanism that verifies external call references in a computer program. The external call reference verification mechanism checks the computer program after the computer program has been loaded by a loader/linker. The loader/linker stores a list of trusted entry points that specifies a trusted entry point for each external call reference, along with a list of allowable caller code for each trusted entry point. The external call reference verification mechanism determines the entry point for each instruction that is an external call reference, determines whether the entry point is listed as the trusted entry point for the external call reference, and whether the external call reference instruction is in the list of allowable caller code for the trusted entry point. If so, the computer program is verified. If not, verification of the computer program fails.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

The claims and disclosure herein provide way to verify a computer program that includes external call references. Because external call references are not resolved until the computer program is loaded, the verification of the external call references is done using information stored in the loader/linker. As the loader/linker loads the computer program, it compiles a list of trusted entry points that specify a trusted entry point for each external call instruction. Each trusted entry point has a corresponding list of caller code that calls the trusted entry point. When verification of the computer program needs to be performed after the computer program is loaded, each external call reference is checked to make sure its entry point is in the list of trusted entry points. If so, the list of authorized caller code that calls the external entry point is read. Once all external call references in a computer program have been verified, the entire computer program has been verified.

Program verification may be performed at different times. For example, when an update to a computer program is initially downloaded to a person's computer system, the digital signature may be used to validate the update. Use of a digital signature is an effective way to initially check the validity of computer program before it is installed. However, there is a threat that after the update is installed, a hacker could make attempts to change the computer program. As a result, repeating the verification of the digital signature could be performed on a periodic basis to verify the program has not changed. However, as explained in the Background Art section above, because digital signatures typically include only the invariant data in a computer program, external call references present a point of vulnerability to hacker attack. If a hacker hacks an external call reference to call unauthorized code, the verification using the digital signature will not catch the hacker. As a result, the verification of external call references presented herein is done after the computer program has been loaded by the loader/linker. As the computer program is loaded, information for each external call reference is stored. Trusted entry points for all external call references are listed. In addition, authorized code portions (i.e., caller code) that include the external call references that call each trusted entry point are also listed. If a hacker hacks an external call reference to call unauthorized code, the location of the unauthorized code will not be listed as a trusted entry point. As a result, the verification of external call references disclosed and claimed herein will catch attempts by hackers at the point of external call references.

Figure 1:
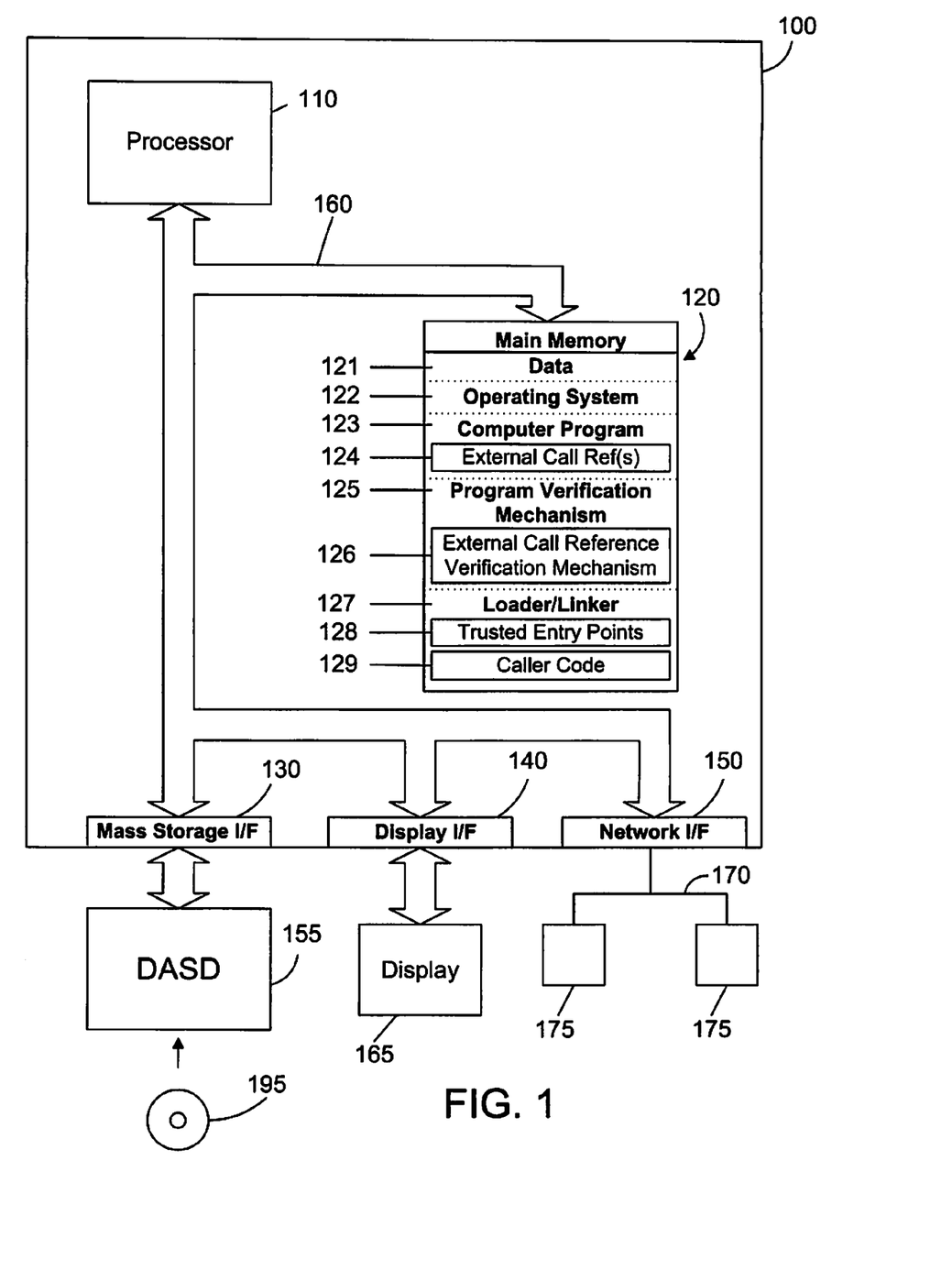
FIG. 1 is a block diagram of an apparatus that includes a program verification mechanism that verifies external call references in a computer program.

Referring to FIG. 1, a computer system 100 is one suitable implementation of a computer system that includes a program verification mechanism that performs checks of external call references in a computer program. Computer system 100 is an IBM eServer System i computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 preferably contains data 121, an operating system 122, a computer program 123, a program verification mechanism 125, and a loader/linker 127. Data 121 represents any data that serves as input to or output from any program in computer system 100. Operating system 122 is a multitasking operating system known in the industry as i5/OS; however, those skilled in the art will appreciate that the spirit and scope of this disclosure is not limited to any one operating system. Computer program 123 is any suitable computer program. The computer program 123 preferably includes one or more external call references 124. External call references 124 are calls to code external to the computer program 123, such as calls to operating system 122. Program verification mechanism 125 includes an external call reference verification mechanism 126 that verifies the external call references 124 in the computer program 123 to make sure a hacker has not changed an external call reference 124 to call unauthorized code.

The loader/linker 127 loads the computer program 123 so the computer program 123 may be executed. During the loading of the computer program 123, the loader/linker 127 creates data structures with information regarding the external call references 124. In particular, the loader/linker 127 creates a list that specifies a trusted entry point 128 for each external call reference. In addition, the loader/linker creates a list of caller code 129 that indicates which portions of the computer program 123 may call the external call reference at each trusted entry point. After the computer program 123 is loaded, the program verification mechanism 125 may perform a check to make sure the computer program 123 has not been altered by a hacker to call unauthorized code. This check may be performed at any time at the request of a user, or may be performed periodically at set time intervals (such as once a day or once a week). When the program verification mechanism 125 checks the computer program 123, the external call reference mechanism 126 analyzes each external call reference 124 in the computer program 123, determines the entry point of each external call reference 124, determines whether each entry point is the trusted entry point for the external call reference, and determines whether the code that contains the external call reference is in the list of callers for the trusted entry point. If so, the computer program 123 is verified. If not, the verification of the computer program 123 fails.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, computer program 123, program verification mechanism 125, and loader/linker 127 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122.

Although computer system 100 is shown to contain only a single processor and a single system bus, those skilled in the art will appreciate that a program verification mechanism may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150. Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

At this point, it is important to note that while the description above is in the context of a fully functional computer system, those skilled in the art will appreciate that the program verification mechanism may be distributed as an article of manufacture in a variety of forms, and the claims extend to all suitable types of computer-readable media that bear instructions that may be executed by a computer. Examples of suitable computer-readable media include recordable media such as floppy disks and CD-RW (e.g., 195 of FIG. 1).

Embodiments herein may also be delivered as part of a service engagement with a client corporation, nonprofit organization, government entity, internal organizational structure, or the like. These embodiments may include configuring a computer system to perform some or all of the methods described herein, and deploying software, hardware, and web services that implement some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 2:
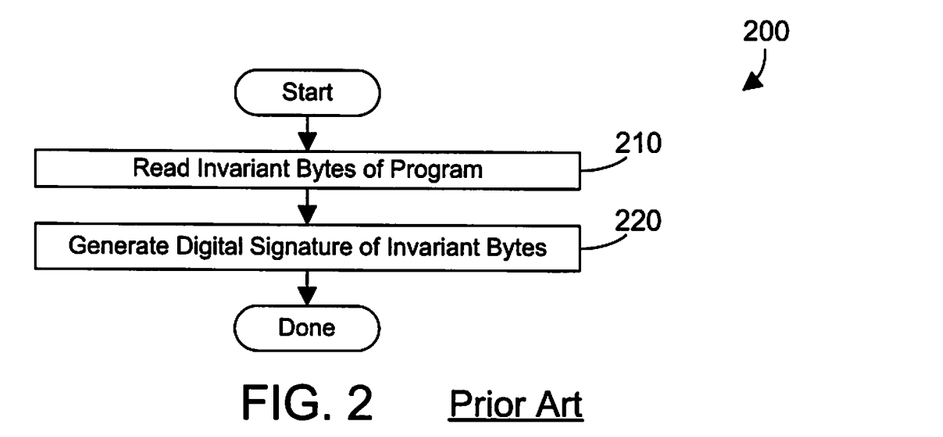
FIG. 2 is a flow diagram of a prior art method for generating a digital signature of invariant bytes of a computer program.

Referring to FIG. 2, a flow diagram of a prior art method 200 for creating a digital signature for a computer program begins by reading the invariant bytes of the computer program (step 210). A digital signature is then generated based on the invariant bytes (step 220). The invariant bytes of a computer program are those bytes that do not change. Variant bytes, which are those that may change, are not included in the generation of the digital signature. Various methods for generating a digital signature in step 220 are well-known in the art, so the details are not discussed herein.

Figure 3:
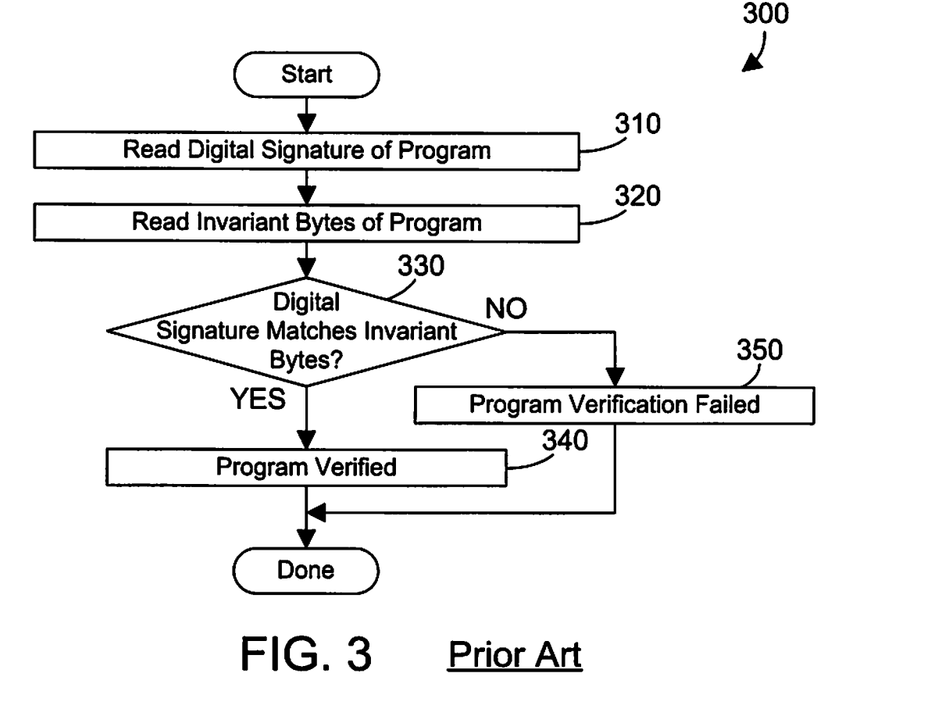
FIG. 3 is a flow diagram of a prior art method for verifying a computer program using the digital signature generated in method 200 shown in FIG. 2.

A method 300 in FIG. 3 shows how the digital signature created in method 200 in FIG. 2 is used in the prior art to verify a computer program. First, the digital signature is read (step 310). The invariant bytes of the program are then read (step 320). If the digital signature matches the invariant bytes (step 330=YES), the program is verified (step 340). If the digital signature does not match the invariant bytes (step 330=NO), the verification of the program fails (step 350).

While the prior art methods for generating a digital signature in FIG. 2 and verifying a computer program using the digital signature in FIG. 3 are effective in checking a computer program when it is initially downloaded, these methods still leave computer programs vulnerable to hacker attack after the computer program has been installed, especially at the external call references. Because the digital signature only covers invariant bytes, and because external call references may change, the digital signature typically does not cover external call references. As a result, a hacker could hack an external call reference to call unauthorized code, and such a change would not be detected by method 300 in FIG. 3. As a result, new and improved methods for program verification are needed to prevent hacker attacks at the external call references of a computer program. The program verification mechanism disclosed and claimed herein provides a way to prevent hackers from hacking external call references in a computer program to call unauthorized code.

Figure 4:
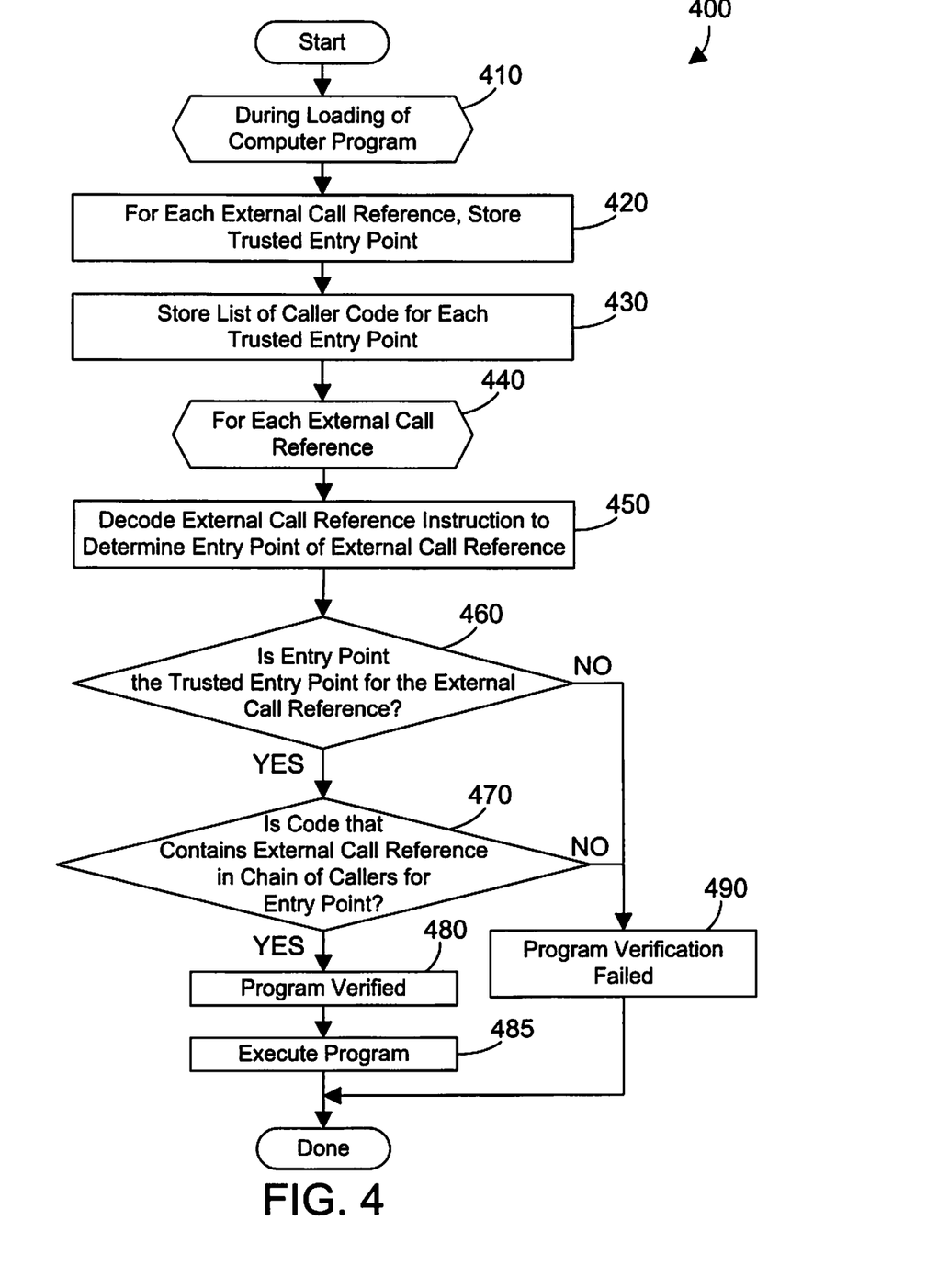
FIG. 4 is a flow diagram of a method for verifying a computer program that includes external call references.

Referring to FIG. 4, a method 400 stores information during the loading of a computer program, and uses this stored information to verify the computer program any time after it is loaded. During loading of the computer program (step 410), a list is created, and in that list is stored a trusted entry point for each external call reference (step 420). A list of caller code is also stored for each trusted entry point (step 430). Note that the caller code may specify any suitable instruction or group of instructions. For example, the caller code may specify a module. In the most preferred implementation, the caller code is the instruction with the external call reference. In addition, in the most preferred implementation, steps 410, 420 and 430 are performed by the loader/linker 127 in FIG. 1, which generates the list of trusted entry points 128 in step 420 and generates the list of caller code 129 in step 430. Once the loader/linker has finished loading the computer program, the computer program may be executed.

Anytime after the loading of the computer program, the program verification mechanism 125 may verify the computer program. One suitable way to perform the computer program verification is to perform steps 440-490 in FIG. 4. For each external call reference (step 440), the external call reference instruction is decoded to determine an entry point (step 450). The entry point is then compared with the list of trusted entry points 128 to determine whether the entry point is the trusted entry point for the external call reference (step 460). If the entry point is the trusted entry point (step 460=YES), a check is made to see if the code that contains the external call reference is in the chain of callers for the entry point (step 470). If so (step 470=YES), the program is verified (step 480), and may then be executed (step 485). If the entry point is not in the list of trusted entry points (step 460=NO), or if the code that contains the external call reference is not in the chain of callers for the entry point (step 470=NO), the program verification fails (step 490). Verification of the computer program can be initiated at any time by a user executing a verification command, or may be performed at periodic time intervals, such as once a week.

By performing checks of external call references after the computer program is loaded, the program verification mechanism verifies that a hacker has not performed unauthorized modifications to the external call references. As a result, the potential for a hacker to attack a computer program at the external call references is eliminated.

Figure 5:
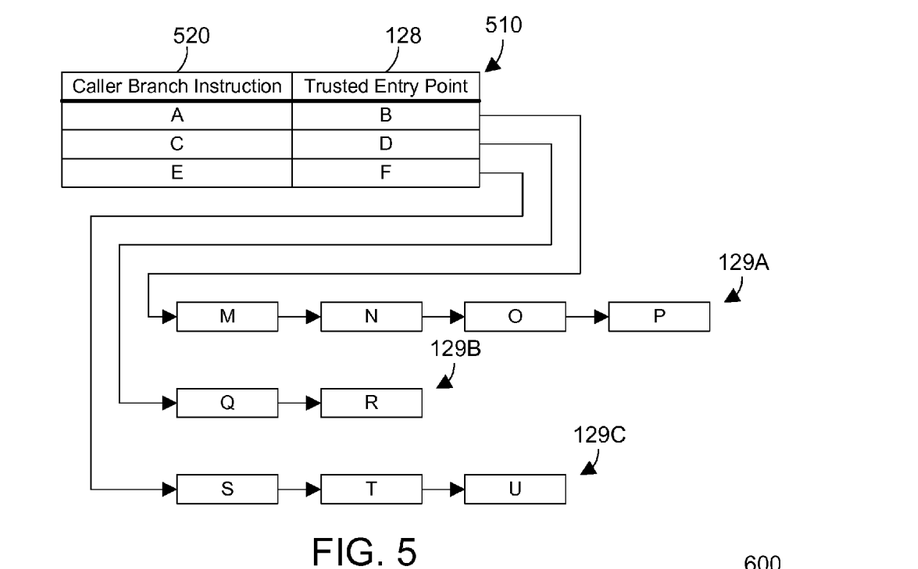
FIG. 5 is a block diagram showing one suitable implementation for data stored by the loader/linker in FIG. 1.

One example of a suitable implementation for the trusted entry points 128 and caller code 129 is shown in FIG. 5. A table 510 correlates a caller branch instruction 520, which corresponds to an external call reference, with corresponding trusted entry points 128. In addition, each trusted entry point has a linked list of callers that call the caller branch instruction at the trusted entry point. Linked lists 129A, 129B and 129C are shown as possible portions of the caller code 129 for a particular trusted entry point. We assume for this example a caller branch instruction A is within code portion N. The caller branch instruction A has a corresponding trusted entry point B in table 510. The trusted entry point B has a corresponding chain 129A of callers that includes modules M, N, O and P. Note that module N calls caller branch instruction A, as stated above. The result is a data structure from which the program verification mechanism can determine whether the caller branch instruction has a trusted entry point, and if so, if the caller is authorized at the trusted entry point. Note the caller code specified in the linked list may be any suitable group of instructions, such as a module. In the most preferred implementation, the caller code in the linked list is the address of the caller branch instruction for the trusted entry point.

Method 400 in FIG. 4 checks in step 460 to see if the caller branch instruction that is the external call reference has an entry point that is in the trusted entry point. This can be considered a first verification if the computer program. If the first verification passes (step 460=YES), the chain of callers for the trusted entry point is then analyzed to see if the code that included the caller branch instruction is authorized to call the caller branch instruction at the trusted entry point (step 470). Step 470 thus provides a second verification of the computer program. The disclosure and claims herein expressly extend to performing step 460 without performing step 470, and to performing both step 460 and step 470.

Figure 6:
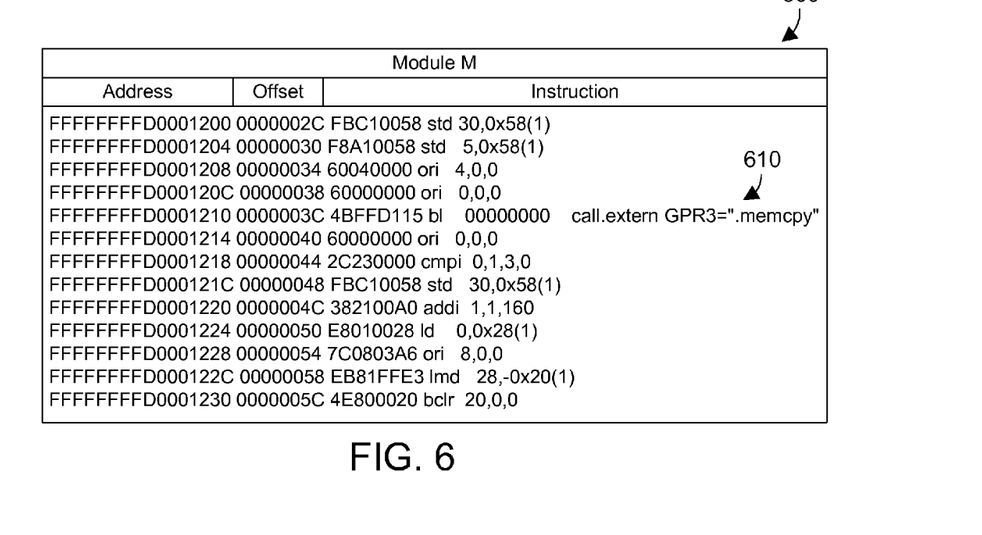
FIG. 6 is a sample portion of a computer program that contains an external call reference.
Figure 7:
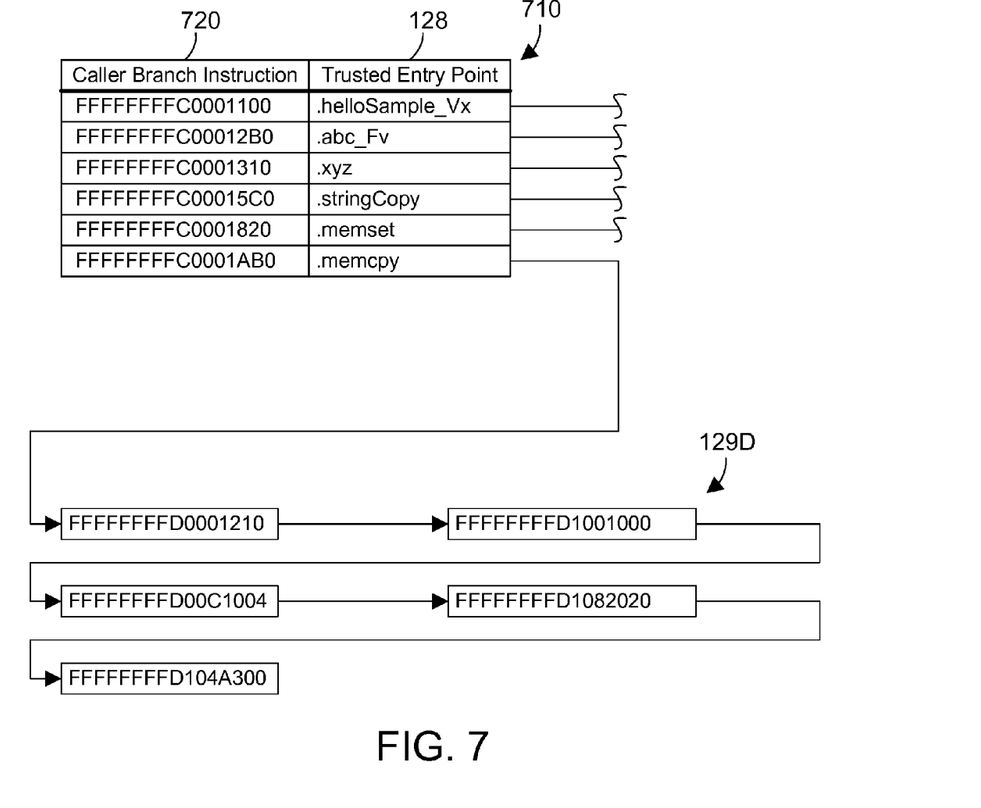
FIG. 7 is sample data stored in the loader/linker for the sample computer program portion in FIG. 6.

A very simple example is now provided to illustrate the general concepts presented above. Referring to FIG. 6, we assume a module M 600 is part of a computer program being verified, and module M includes an instruction 4BFFD115 at address FFFFFFFFD0001210 that is an external call reference as shown at 610. We further assume the table 710 in FIG. 7 was generated during the loading of the computer program in steps 410, 420 and 430 in FIG. 4. We now consider the external call reference at instruction 4BFFD115 at address FFFFFFFFD0001210 (step 440). This instruction is decoded to determine the target address (i.e., entry point) of the branch instruction. We assume for this example the decoding produces a target address of FFFFFFFFC0001AB0, which is the location of the .memcpy entry point, as shown at 720 in table 710 in FIG. 7. The .memcpy entry point is the trusted entry point for the instruction FFFFFFFFC0001AB0, so step 460=YES in FIG. 4. Next, the callers for the trusted entry point are examined to determine if the calling external call reference is in the chain of callers. Note the chains of callers for the first five entries in table 710 is not shown for the purpose of convenience. We assume for this example the .memcpy trusted entry point includes five external call references in its chain of callers 129D. Because the external call reference 610 in FIG. 6 is at address FFFFFFFFD0001210, and because this address is the first address in the chain 129D shown in FIG. 7, step 470=YES, so the program is verified (step 480) and may be executed (step 485).

The program verification mechanism 125 shown in FIG. 1 may optionally perform the prior art steps in method 200 in FIG. 2 and method 300 in FIG. 3 in addition to the steps shown in method 400 in FIG. 4. The program verification mechanism 125 may thus be used to verify a downloaded computer program before it is installed using the digital signature (as in the prior art), and may also be used to periodically check the computer program after it is loaded. This combination of features makes the program verification mechanism 125 powerful, eliminating a point of potential vulnerability to hackers.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

What is claimed is:

1. An apparatus comprising:
   at least one processor;
   a memory coupled to the at least one processor;
   a computer program residing in the memory, the computer program including a plurality of external call references to code external to the computer program; and
   a program verification mechanism residing in the memory and executed by the at least one processor before the at least one processor executes the computer program, the program verification mechanism, after the computer program has been loaded, selecting one of the plurality of external call references and analyzing the selected external call reference and determining an entry point in the computer program corresponding to the selected external call reference, the program verification mechanism determining whether the corresponding entry point is in a list of trusted entry points that specifies a trusted entry point for the selected external call reference, and if so, the program verification mechanism repeats the analysis for each of the plurality of external call references, and when all of the plurality of external call references have the corresponding entry point in the list of trusted entry points that specifies a trusted entry point, providing a first verification of the computer program, wherein, in response to the first verification of the computer program, the program verification mechanism determines whether a code portion that includes one of the plurality of external call references is in a list of allowed caller code for the corresponding entry point, and if so, the program verification mechanism provides a second verification of the computer program, wherein the at least one processor begins execution of the computer program after receiving the first verification of the computer program and the second verification of the computer program from the program verification mechanism.

2. The apparatus of claim 1 wherein the list of trusted entry points and the list of allowed caller code are constructed by a loader/linker when the computer program is loaded for execution.

3. The apparatus of claim 1 wherein the allowed caller code comprises an instruction.

4. The apparatus of claim 1 wherein the list of allowed caller code comprises a linked list.

5. The apparatus of claim 1 wherein the program verification mechanism further reads invariant bytes of the computer program and determines whether a digital signature for the program matches the invariant bytes.

6. A computer-implemented method for verifying a computer program that comprises a plurality of external call references to code external to the computer program, the method comprising the steps of:
   providing at least one processor;
   providing a memory coupled to the at least one processor, the memory containing the computer program;
   the at least one processor performing the steps of:
   (A) after loading of the computer program and before executing the computer program, performing the steps of:
      (A1) selecting one of the plurality of external call references;
      (A2) analyzing the selected external call reference and determining an entry point in the computer program corresponding to the selected external call reference;
      (A3) determining whether the corresponding entry point is in a list of trusted entry points that specifies a trusted entry point for the selected external call reference;
      (A4) if the corresponding entry point is the trusted entry point for the selected external call reference, indicating successful verification of the selected external call reference;
      (A5) repeating steps (A1), (A2), (A3) and (A4) for each of the plurality of external call references in the computer program;
      (A6) when all of the plurality of selected external call references are indicated as successful verification in step (A4), providing a first verification of the computer program;
      (A7) selecting one of the plurality of external call references;
      (A8) determining whether a code portion that includes the selected external call reference is in a list of allowed caller code for the corresponding entry point;
      (A9) when the code portion that includes the selected external call reference is in the list of allowed caller code for the corresponding entry point, indicating successful verification of the code portion that includes the selected external call reference;
      (A10) repeating steps (A7), (A8) and (A9) for each of the plurality of external call references in the computer program;
      (A11) when all code portions are indicated as successful verification in step (A9), providing a second verification of the computer program;
   (B) after receiving the first verification of the computer program and the second verification of the computer program, executing the computer program.

7. The method of claim 6 wherein the list of trusted entry points and the list of allowed caller code are constructed by a loader/linker when the computer program is loaded for execution.

8. The method of claim 6 wherein the allowed caller code comprises an instruction.

9. The method of claim 6 wherein the list of allowed caller code comprises a linked list.

10. The method of claim 6 further comprising the steps of:
reading invariant bytes of the computer program; and
determining whether a digital signature for the program matches the invariant bytes.

11. A method for deploying computing infrastructure, comprising integrating computer readable code into a computing system, wherein the code in combination with the computing system perform the method of claim 6.

12. A computer-implemented method for verifying a computer program that comprises a plurality of external call references to code external to the computer program, the method comprising the steps of:
providing at least one processor;
providing a memory coupled to the at least one processor, the memory containing the computer program;
the at least one processor performing the steps of:
(A) reading a digital signature for the computer program;
(B) reading the invariant bytes of the computer program;
(C) if the digital signature matches the invariant bytes, performing the steps of:
  (C1) loading the computer program for execution, and during the loading of the computer program and before executing of the computer program, performing the steps of:
    (C1A) for each external call reference in the computer program, storing a corresponding trusted entry point;
    (C1B) creating a list of allowed caller instructions that specifies a trusted entry point for each allowed caller instruction;
  (C2) before executing the computer program, verifying the computer program by analyzing each external call reference to code external to the computer program by selecting one of the plurality of external call references, and performing the steps of:
    (C2A) analyzing the selected external call reference and determining an entry point in the computer program corresponding to the selected external call reference;
    (C2B) determining whether the corresponding entry point is the trusted entry point for the selected external call reference;
    (C2C) if the corresponding entry point is the trusted entry point for the selected external call reference, performing the steps of:
      (C2C1) determining whether the selected external call reference is in the list of allowed caller instructions for the corresponding entry point;
      (C2C2) when the selected external call reference is not in the list of allowed caller instructions for the corresponding entry point, indicating the computer program is not verified; and
      (C2C3) when the selected external call reference is in the list of allowed caller instructions for the corresponding entry point, indicating the computer program is verified; and
    (C2D) repeating steps (C2A), (C2B) and (C2C) for all of the plurality of external call references in the computer program;
  (C3) executing the computer program when all of the plurality of external call references in the computer program are indicated as verified in step (C2C3); and
  (C4) not executing the computer program when any of the plurality of external call references in the computer program is indicated as not verified in step (C2C2).

13. An article of manufacture comprising software residing on non-transistory recordable media, the software comprising:
a program verification mechanism comprising instructions executable by a computer, the program verification mechanism, after a computer program has been loaded and before execution of the computer program begins, analyzes a plurality of external call references in the computer program to code external to the computer program by selecting one of the plurality of external call references and determines an entry point in the computer program corresponding to the selected external call reference, and determines whether the corresponding entry point is in a list of trusted entry points that specifies a trusted entry point for the selected external call reference, and if so, repeating the analysis for each of the plurality of external call references, and when all of the plurality of external call references have the corresponding entry point in the list of trusted entry points that specifies a trusted entry point, providing a first verification of the computer program, wherein, in response to the first verification of the computer program, the program verification mechanism determines whether a code portion that includes one of the plurality of external call references is in a list of allowed caller code for the corresponding entry point, and if so, the program verification mechanism provides a second verification of the computer program, wherein execution of the computer program begins after the first verification of the computer program and after the second verification of the computer program by the program verification mechanism.

14. The article of manufacture of claim 13 wherein the list of trusted entry points and the list of allowed caller code are constructed by a loader/linker when the computer program is loaded for execution.

15. The article of manufacture of claim 13 wherein the allowed caller code comprises an instruction.

16. The article of manufacture of claim 13 wherein the list of allowed caller code comprises a linked list.

17. The article of manufacture of claim 13 wherein the program verification mechanism further reads invariant bytes of the computer program and determines whether a digital signature for the program matches the invariant bytes.

* * * * *